C. C. RYSDON.
SKYLIGHT.
APPLICATION FILED JAN. 25, 1916.

1,236,008.

Patented Aug. 7, 1917.

Inventor:
Charles C. Rysdon,
by Spear, Middleton, Donaldson & Spear
Att'ys.

UNITED STATES PATENT OFFICE.

CHARLES C. RYSDON, OF LA CROSSE, WISCONSIN, ASSIGNOR TO BADGER STEEL ROOFING & CORRUGATING COMPANY, OF LA CROSSE, WISCONSIN, A CORPORATION OF WISCONSIN.

SKYLIGHT.

1,236,008.  Specification of Letters Patent.  Patented Aug. 7, 1917.

Application filed January 25, 1916. Serial No. 74,216.

*To all whom it may concern:*

Be it known that I, CHARLES C. RYSDON, a citizen of the United States, residing at La Crosse, Wisconsin, have invented certain new and useful Improvements in Skylights, of which the following is a specification.

My invention is designed to provide a simple construction of sky-light for use on a hog-house or in any other like situation, the purpose being to provide a very simple and economical structure of galvanized metal adapted to support glass in the sky-light opening and a netting above the glass so as to protect the same and at the same time to provide for the ready carrying off of the water of condensation or any water that may leak through to the interior of the structure.

In the accompanying drawing, I have shown a plan view in Figure 1;

Fig 2 is a section on line 2—2 of Fig 1, while,

Figure 1:
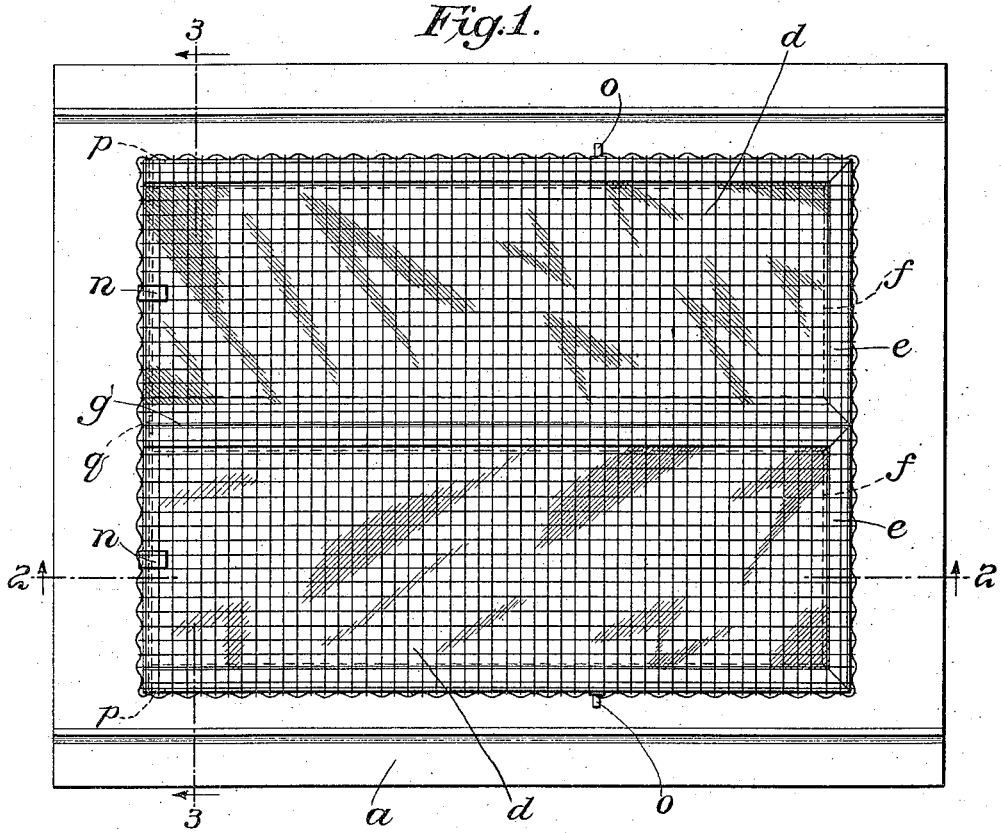
Figure 2:
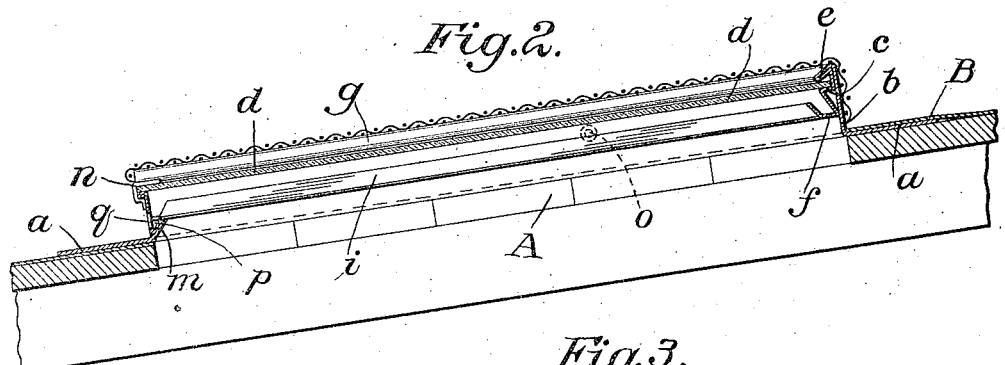

As shown in Figs. 1 and 2 the sky-light is arranged over an opening A in the roof of the house to which it is applied, the roof being preferably and usually inclined and as is usual in such structures, it consists of galvanized sheet metal constituting a frame preferably in two panels, the panels carrying panes of glass suitably supported by the metallic frame-work and above the glass a shield of wire netting is secured.

I have aimed to very materially simplify the construction and cheapen it by making the frame of very few parts and so forming the structure as to make it strong; sufficient for all the requirements of the situation in which it is placed providing for the secure holding of the glass; the support of the wire netting and to amply provide for drainage purposes.

As shown in Fig. 2 I utilize a galvanized sheet metal plate having a lower flange $a$ which is inserted beneath a part of the roof covering B and this has a right-angular upwardly extending portion $b$ forming the upper wall of the sky-light and the upper end of the part $b$ is extended over and doubled to form a shoulder $c$ for the support of the glass $d$, the upper part of the glass being held in place by the overhanging doubled extension $e$ of the flange $b$. Beneath the shoulder $c$ the metal is bent into the form of a gutter, as shown at $f$.

Figure 3:
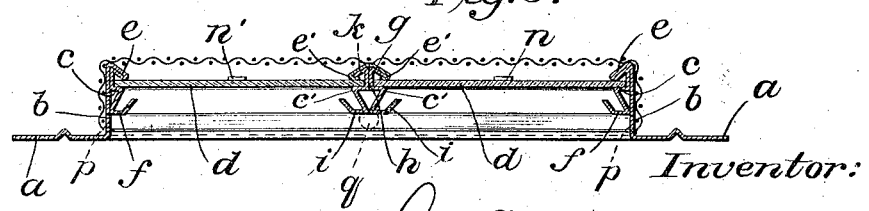
Fig. 3 is a section on line 3—3 of the same figure.

Preferably in order to cheapen the structure and render unnecessary exceptionally wide panes of glass I make the sky-light with a division wall down its center, as shown at $g$ in Fig. 1 and Fig. 3 and this as shown in the latter figure is made of two strips of galvanized iron, soldered or otherwise secured together at the point $h$ forming a web, while from this point downwardly the metal is bent into the form of two gutters $i$ and above the web the upper ends of the metal are bent outwardly and are covered by a cap $k$, the edges of the glass at this point being held and supported between the shoulders $c'$ and the overhanging edges $e'$. As shown in Fig. 3 the side walls $b$ are of exactly the same construction as the top wall. At the bottom of the sky-light I form a trough section $m$ into which the side troughs $f$ discharge and the drainage passes from the trough $m$ out through openings in each end $p$ and center $v$.

In order further to hold the glass in place, I use copper strips $n$ shown bent over in Fig. 1, at the left-hand side, these strips also being shown in Figs. 2 and 3. In order to protect the glass from being broken from anything being dropped upon it, I utilize the usual wire netting, which passes over the top and down the side walls, engaging the pins $o$, as shown in Figs. 1 and 2, the netting being held approximately two inches above the glass so as to effectually break the fall of anything dropped upon it. At the end of the bottom wall I leave a space through which the panes of glass may be inserted into place and afterward clamped by the strips $n$.

What I claim is:

In a sky-light, a sheet metal wall for the upper end and sides, made of approximately right angular sections comprising a horizontal supporting flange and a vertical flange or end, the vertical flange having its upper edges doubled or folded and then bent inward and downward to engage the top surface of the glass, the portion folded extending down beside the inner side of the vertical wall, then horizontally to form a shoulder, then at an incline downward toward the vertical wall into bracing contact therewith, and then being turned inward and upward to form a gutter.

In testimony whereof, I affix my signature in presence of two witnesses.

CHARLES C. RYSDON.

Witnesses:
 KATHRYN STEEKMAN,
 GUST. F. SEXAUER.

Copies of this patent may be obtained for five cents each, by addressing the "Commissioner of Patents, Washington, D. C."